Jan. 9, 1934.      M. B. BENSON      1,942,796
REDUCTION GEAR DRIVE
Filed April 11, 1931
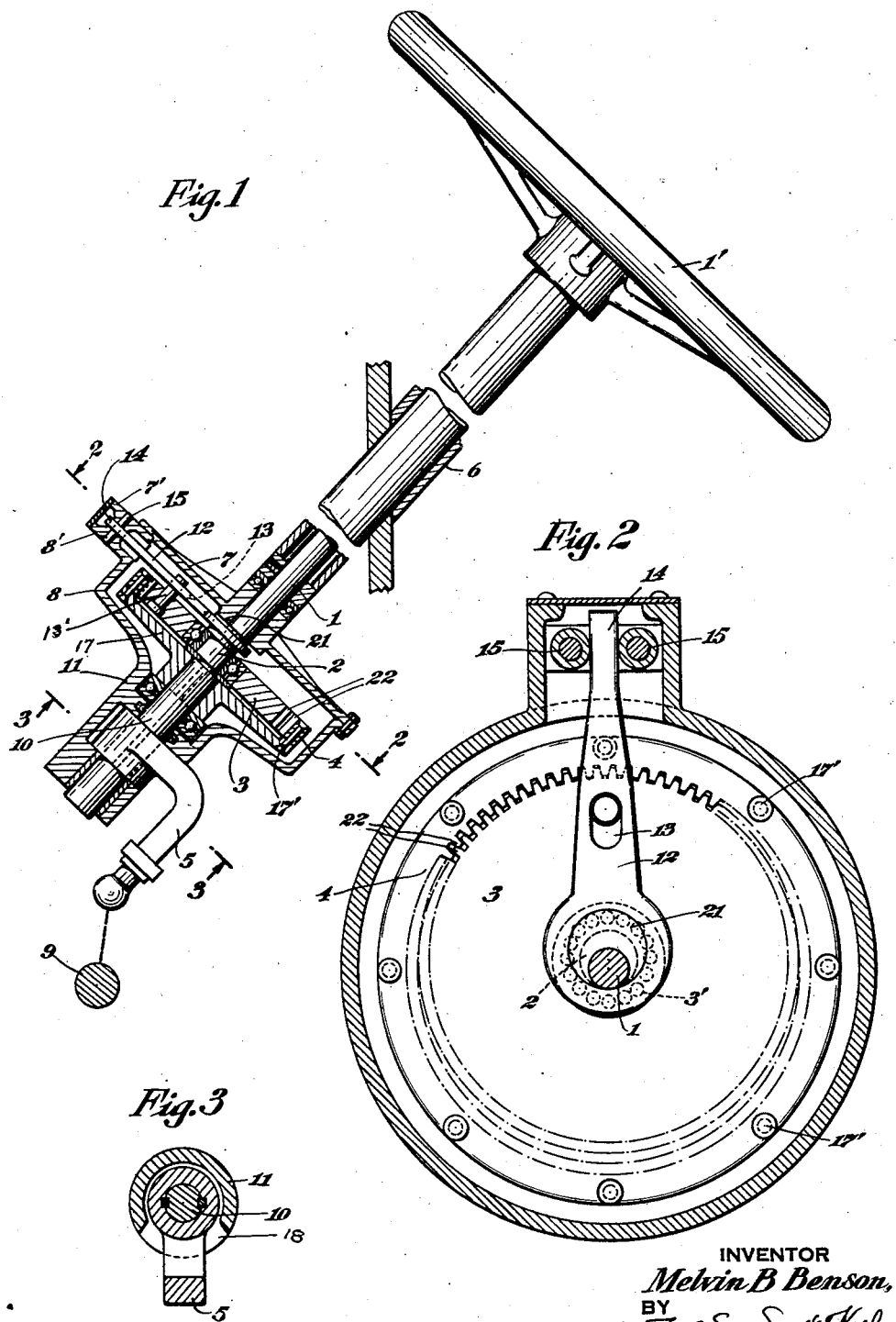
INVENTOR
*Melvin B Benson,*
BY
*Bartlett Eyre Scott Keel*
ATTORNEYS Patented Jan. 9, 1934

1,942,796

UNITED STATES PATENT OFFICE 1,942,796

REDUCTION GEAR DRIVE

Melvin B. Benson, New York, N. Y., assignor, by mesne assignments, to Melvin B. Benson Corporation, New York, N. Y., a corporation of New York Application April 11, 1931. Serial No. 529,390

1 Claim. (Cl. 74—35)

This invention relates to a power transmission and particularly to a reduction gear drive mechanism.

One object of the invention is a reduction gear drive characterized by the large ratio drive obtained with a minimum of gear elements.

A further object of the invention is a reduction gear gyrating drive characterized by the simplicity of its parts and mechanism. A further object of the invention is a reduction drive of this character wherein the drive ratio between the driving and driven elements is maintained uniform throughout each gyrating revolution with consequent uniform velocity and torque, and particularly a drive wherein these characteristics are obtained in a novel and substantially vibrationless and non-pulsating manner. The reduction gear structure here set forth is claimed generically in my application Serial No. 513,571 filed February 5, 1931.

Other objects will hereinafter appear.

For a better understanding of the invention reference may be had to the accompanying drawing forming a part of this application wherein:

Fig. 1 is a side view partly in section showing one embodiment of the invention;

Fig. 2 is a cross-sectional view on the line 2—2 of Fig. 1; and

Fig. 3 is a sectional view on the line 3—3 of Fig. 1.

Referring to the drawing I have illustrated my invention as applied to steering posts and I have indicated at 1 a conventional steering post, with a wheel 1' on one end for actuating said post, this steering post being housed in a tubular structure 20 which is supported near its upper end in the sleeve 6 and the post being journalled at its upper end in the housing 20 and its lower end in a housing member 7, the other and mating housing member being indicated at 8. At 9 I have indicated a conventional tie rod or other connection for operating the steering knuckles or device of the steering means, as for example the front wheels of an automobile. The steering mechanism between the steering post 1 and the tie rod 9 includes an eccentric 2 which is keyed to the lower end of the steering post, a gyrating gear 3 which is journalled by means of ball bearings 3' upon the eccentric and an internal gear ring 4 which is traversed by the gyrating gear as it is gyrated by the eccentric. The gear ring 4 is keyed to a stub shaft 10 which is suitably journalled in the hub 11 of the casing member 8, and the motion of the gear ring 4 is transmitted through this stub shaft 10 and thence through a bell crank 5 keyed thereto to the tie rod 9 or other connection to the steering gear. The gyrating gear 3 is maintained relatively stationary and prevented from rotation by means of a yoke or lever member 12 which is fastened thereto intermediate its ends by means of a pin slot connection including a slot 13 formed longitudinally of the member 12 and a pin 13' rigidly fastened to the gear 3. This yoke member has an arm 14 projecting up between rollers 15 which are carried by and journalled in upwardly extending projections 7' and 8' of the casing members 7 and 8, and is movably mounted at its lower end upon the steering post 1 by means of an eccentric 21 the latter being larger than the eccentric 2 and substantially twice as large, and as is shown in the drawing the pin slot connection is approximately midway between the rollers 15 and the steering post 1 which proportion is essential where, as shown, the eccentricity of the eccentric 21 is twice the eccentricity of the eccentric 2. When the throws of the eccentrics are varied with respect to each other the distances from the pin slot connection must also be proportionately varied and in any case the eccentricity of the larger eccentric 21 bears the same relation to the eccentricity of the smaller eccentric 2 as the distance from the pivotal connection at the rollers 15 to the center of the post 1 bears to the average distance of the pin slot connection to the rollers 15. The gear ring 4 is indicated as being formed separately from a disc carrying wheel 17, the latter being keyed to the stub shaft 10 and the former being fastened to the disc by means of bolts 17'. In the particular embodiment shown the crank 5 and the gear ring 4 to which it is attached is limited in the movements by the crank 5 engaging the walls 18 of the slot through the hub or casing 11 through which the crank passes. The speed reduction ratio between the shaft or steering post 1 and the ring 4 depends upon the relative number of teeth of the two gears, this ratio being equal to the number of teeth in the gear ring divided by the difference in the number of teeth of the two gears, assuming, of course, equally spaced teeth on the two gears. The steering gear is substantially irreversible namely, while power may be transmitted from the steering post 1 to the crank 5 insufficient power may be transmitted from the crank to the steering post to cause inconvenience to the operator. This irreversibility is obtained by the proper selection of the relative number of teeth or diameter of the two gears 3 and 4 taking into account the friction. In the particular embodiment shown with 72 teeth in the gear ring and 66 teeth in the gyrating gear, I have found that approximately a pressure angle of 20° for the gear teeth 22 is desired for good clearance, this arrangement also resulting in a substantially irreversible steering gear depending somewhat upon the friction.

The operation of the steering gear is as follows:

The rotation of the steering post by means of the steering wheel results in the gyration of the gyrating gear 3 which is journalled upon the eccentric 2 of the steering post and since the gyrating gear 3 is prevented from rotating it transmits power to the gear ring 4 at a speed reduction ratio depending upon the relative number of teeth of the two gears. The arm 14 reciprocates up and down between the rollers 15 during the gyration of the gear and also permits the lateral movements of the gear during such gyration, the arm pivoting between the rollers as the gyrating gear moves from side to side. As above indicated, the rotation preventing arm or member 12 is mounted at its lower end upon an eccentric carried by the steering post 1, this eccentric being substantially twice the size of the eccentric 2 and resulting in the movement of the lower end of the member 12 following the gyrating movements of the gear 3. By means of this construction the slot pin engagement between the gyrating gear 3 and the member 12 is shifted laterally proportionally and equally to the movement of the gyrating gear, and accordingly the gyrating gear 3 is substantially uniformly oriented throughout the range of movement with resultant uniform movements of the crank arm 5 for unit of angular movement of the steering post 1, which is important in structures of this character.

With this construction the wear between the gears 3 and 4 is distributed throughout a multiplicity of teeth. For example, with the 12 to 1 speed reduction ratio indicated, and with 72 teeth in the gear ring and 66 in the gyrating gear, approximately 18 or more teeth are in engagement at one time thereby distributing the wear over a comparatively large surface. The gear can, therefore, be operated indefinitely without the necessity for adjustments, repairs or replacements experienced in the conventional type of steering gear, wherein the small surface contact results in the formation of flat spots very quickly due to the vibration set up by the unevenness of the roadways and by the continued actuation of the steering gear. Moreover, the gear is substantially irreversible due to the especial correlation of structure and of gear diameters and the friction of the gyral gear bearing. This irreversibility may be varied if desired by changing the number of teeth in the gears, with a given speed ratio. The preferred degree of irreversibility is where the driver can just barely feel the road through the steering wheel, but not enough to react too strongly on the steering wheel when going over rough roads. A further advantage of the gear herein shown is that the necessity of the U-crank connection in the conventional worm steering gear is obviated together with the shimmying of the front wheels incident thereto. The steering gear mechanism herein set forth operates in the same plane or in planes parallel to the tie rod whereby the connections with the tie rod are simply effected while the cost of manufacture and assembly is substantially reduced. It also enables a construction of a stop at the end of the travel integral with the casting which supports the bearing of the internal gear. The friction of the gyral gear bearing upon the eccentric depends, among other things, upon the type of bearing employed, and by properly balancing the leverage due to the eccentricity with the friction or resistance to rotation upon the eccentric the exact degree of irreversibility desired may be obtained.

I claim:

A gearing system including an internal gear member connected with the device to be driven, a drive shaft, an eccentric carried by said shaft, a gyrating gear journalled on said eccentric and caused to traverse said internal gear by the rotation of said shaft and eccentric and means for preventing rotation of the gyrating gear and for maintaining a uniform drive ratio throughout the cycle, comprising an arm mounted at one end by means of a second eccentric operating in timed relation with the first named eccentric but having a greater eccentricity than that of the first named eccentric, said arm being pivotally and reciprocably connected with the frame at the other end and having intermediate its ends a rotation restraining connection with the gyrating gear permitting relative radial movements.

MELVIN B. BENSON.